(12) United States Patent
Kubo et al.

(10) Patent No.: US 6,301,212 B1
(45) Date of Patent: Oct. 9, 2001

(54) FOCUSING AND TRACKING SERVO CIRCUIT IN AN OPTICAL DISK DEVICE

(75) Inventors: Mitsumasa Kubo, Tachikawa; Yoshiyuki Otsuka, Akishima, both of (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 09/668,658

(22) Filed: Sep. 22, 2000

(30) Foreign Application Priority Data

Sep. 24, 1999 (JP) .................................................. 11-271163

(51) Int. Cl.$^7$ ........................................................ G11B 7/00
(52) U.S. Cl. .................. 369/53.2; 369/53.28; 369/53.23; 369/44.26; 369/44.27; 369/44.35; 369/44.41
(58) Field of Search ............................. 369/44.27, 44.28, 369/44.34, 44.35, 47.25, 44.26, 47.55, 53.2, 53.28, 53.37, 53.23

(56) References Cited

U.S. PATENT DOCUMENTS 4,853,915 * 8/1989 Takasago et al. ...................... 369/54
5,757,748 * 5/1998 Kiyoura et al. .................... 369/44.29
5,867,463 * 2/1999 Chiba ................................ 369/44.29

* cited by examiner

Primary Examiner—Nabil Hindi
(74) Attorney, Agent, or Firm—Anderson, Kill & Olick, P.C.

(57) ABSTRACT

The present invention provides a focusing and tracking servo circuit used in an optical disk device that can maintain stability of the focusing and tracking servo at a time of recording or reproduction. This focusing and tracking servo circuit includes: a first storage unit that stores a parameter corresponding to light beam power at a time of recording; a second storage unit that stores a parameter corresponding to light beam power at a time of reproduction; and a selector unit that selects from the parameters stored in the first and second storage units upon switching between recording and reproduction, and sets the selected parameters in a detector unit. With this structure, the parameters can be instantly switched at the same time as the switching between recording and reproduction, and the stability of the focusing and tracking servo can be maintained.

6 Claims, 10 Drawing Sheets

FOCUSING AND TRACKING SERVO CIRCUIT IN AN OPTICAL DISK DEVICE

BACKGROUND OF THE INVENTION

1. Field of the Invention

The present invention relates to a focusing and tracking servo circuit used in an optical disk device, and, more particularly, to a focusing and tracking servo circuit that performs recording and reproduction on a rewritable optical disk.

2. Description of the Related Art

There are two types of recording optical disks: one is a writing once type, and the other is a rewritable type. A CD-R (Compact Disk Recordable), which is a writing once optical disk, and a CD-RW (Compact Disk Rewritable), which is a rewritable optical disk, are both provided with a pregroove for guiding. Such a pregroove is very slightly wobbled in the radial direction with a center frequency of 22.05 kHz. Address information called ATIP (Absolute TimeIn Pregroove) for recording is multiplexed by FSK (Frequency Shift Keying) modulation with a maximum shift of ±1 kHz, and recorded on the pregroove.

A focusing and tracking circuit used in an optical disk device that performs recording and reproduction on such a recording optical disk emits optical beam on the optical disk, detects the reflection light from the optical disk by a plurality of detectors, generates a focusing and tracking error signal by performing a predetermined arithmetic operation, and drives a focusing and tracking actuator based on the focusing and tracking error signal.

In an optical disk device that performs recording and reproduction on a CD-R, which is a writing once optical disk, light beam power is used as read power at a time of reproduction. At a time of recording, the light beam power is switched between write power and read power (write power>read power) in accordance with the value 0 or 1 of a recording signal. Accordingly, at a time of recording as well as reproduction, the reflection light is sampled at the timing of the light beam power being switched to the read power, thereby generating a focusing and tracking error signal.

In an optical disk device that performs recording and reproduction on a CD-RW, which is a rewritable optical disk, the light beam power is switched between write power and erase power (write power>erase power>read power) at a time of recording, in accordance with the value 0 or 1 of the recording signal. Accordingly, at a time of reproduction, the reflection light is detected at the timing of the light beam power being switched to the read power, thereby generating the focusing and tracking error signal. On the other hand, at a time of recording, the reflection light is sampled at the timing of the light beam power being switched to the erase power, thereby generating the focusing and tracking error signal.

Since the erase power has a higher output than the read power, the servo gain varies with the power. Therefore, it is necessary to change the sensitivity of each detector and the servo gain for recording and reproduction.

Figure 1:
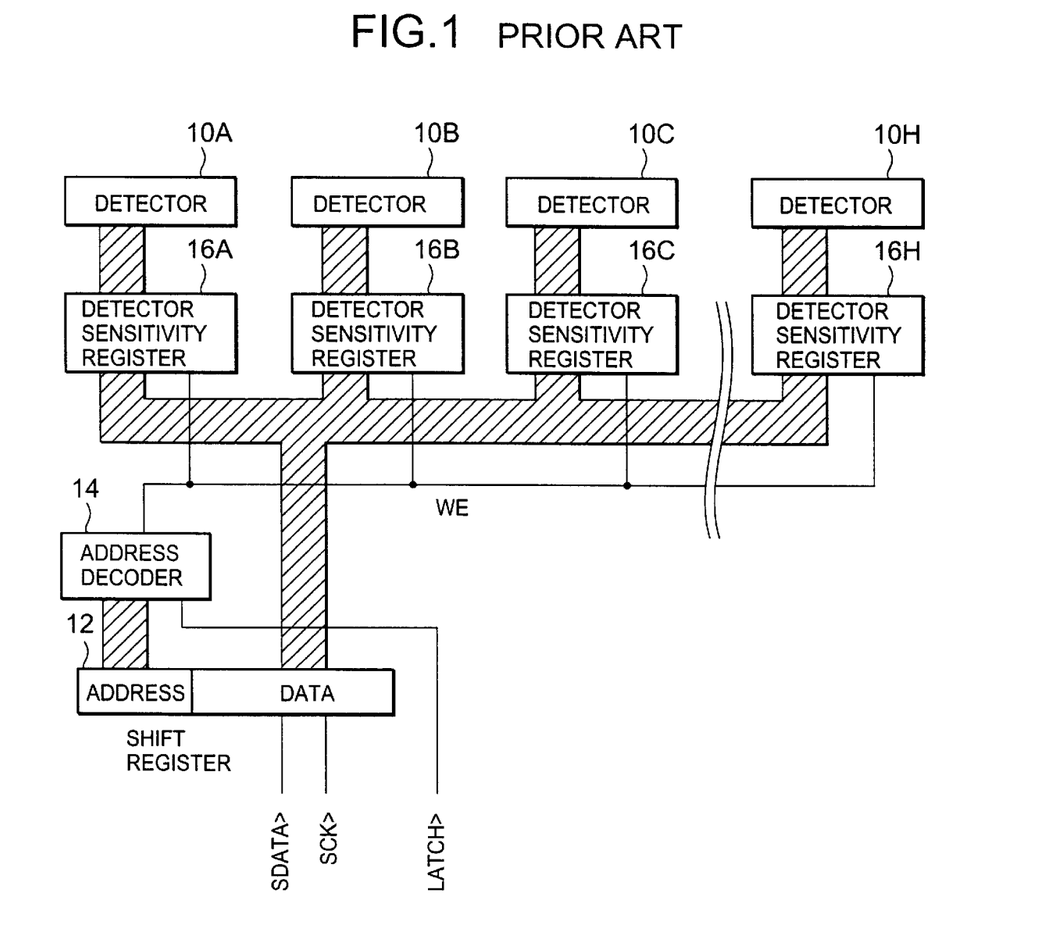
FIG. 1 is a block diagram of an example of a conventional detector sensitivity switching circuit.

FIG. 1 is a block diagram of a conventional detector sensitivity switching circuit. This circuit is disposed inside a head amplifier IC. As shown in FIG. 1, a detector that detects a main light beam spot is divided into four detectors 10A to 10D, a detector that detects a preceding sub beam spot is divided into two detectors 10E and 10F, and a detector that detects a following sub beam spot is divided into two detectors 10G and 10H.

The head amplifier IC performs serial data transfer in order to reduce the number of pins. In compliance with a recording command or a reproduction command that instruct to switch between recording and reproduction, data SDATA consisting of address data and parameter data for setting detector sensitivity is serially transferred from a host device, and then stored in a shift register 12 at the timing of a clock signal SCK. An address decoder 14 decodes the address data stored in the shift register 12, and transmits a write enable signal to one of detector sensitivity registers 16A to 16H corresponding to the address. The detector sensitivity register (16B, for instance) that has received the write enable signal stores the parameter data supplied from the shift register 12. Thus, the detector sensitivity of the detector (10B, for instance) corresponding to the detector sensitivity register (16B, for instance) can be switched.

Figure 2:
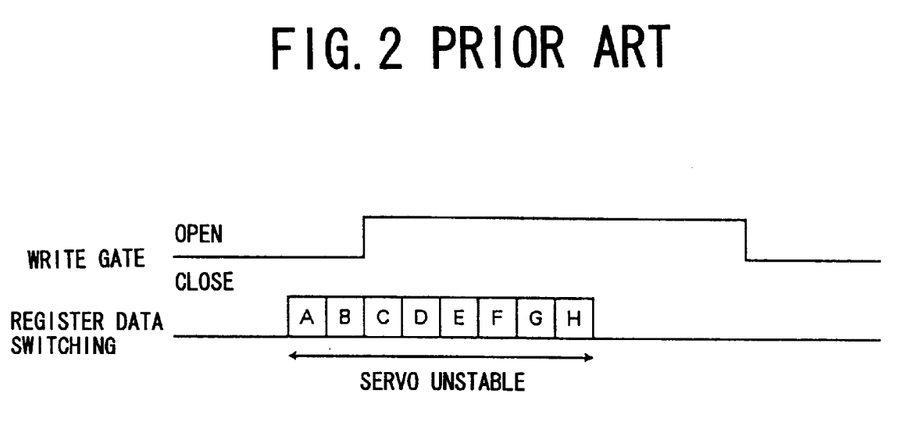
FIG. 2 is a timing chart of detector sensitivity switching in the prior art.

Since the parameter data is serially transferred, a certain period of time is required until the detector sensitivities of all the detectors 10A to 10H are switched. FIG. 2 shows the switching timing of detector sensitivity in the prior art. Based on the ATIP information (timing information) of a wobble signal reproduced from the disk, a write gate is opened by a signal processing circuit, and recording is started. As shown in FIG. 2, the detector sensitivities of the detectors 10A to 10H are serially switched immediately before and after the opening of the write gate. As a result, there is a problem that the focusing servo and tracking servo become unstable.

This problem also arises in a case where the servo gain of the focusing and tracking servo is switched. While the servo gain is serially switched, the focusing servo and tracking servo become unstable. Furthermore, the offset varies with the switching of servo gain. If the switching of servo gain and the switching of offset are nor performed at the same time, the focusing servo and tracking servo become unstable.

SUMMARY OF THE INVENTION

A general object of the present invention is to provide a focusing and tracking servo circuit in which the above disadvantages are eliminated.

A more specific object of the present invention is to provide a focusing and tracking servo circuit that maintains stability in the focusing and tracking servo at a time of switching between recording and reproduction.

The above objects of the present invention are achieved by a focusing and tracking servo circuit used in an optical disk device, which performs recording by increasing light beam power applied onto an optical disk, and performs focusing and tracking servo. This focusing and tracking servo circuit comprises:

a detector unit that detects the light beam reflected from the optical disk;

a first storage unit that stores a parameter corresponding to light beam power at a time of recording;

a second storage unit that stores a parameter corresponding to light beam power at a time of reproduction; and a selector unit that selects from the parameters stored in the first and second storage units in upon switching between recording and reproduction.

In the above focusing and tracking servo circuit, the selected parameter is set in the detector unit or in a corresponding one of a tracking servo gain switching unit, a tracking servo offset switching unit, a focusing servo gain switching unit, and a focusing servo offset switching unit.

Since the parameters selected from those stored in the first and second storage units at a time of switching between recording and reproduction are set in the detecting unit or in the focusing and tracking servo circuit, the parameters can be instantly switched at the same time as the switching between recording and reproduction, and stability can be maintained in the focusing and tracking servo.

In the above focusing and tracking servo circuit of the present invention, each of the parameters may be a detection sensitivity of the detector unit.

Also, in the above focusing and tracking servo circuit of the present invention, each of the parameters may be a servo gain and offset of the focusing and tracking servo circuit.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 3:
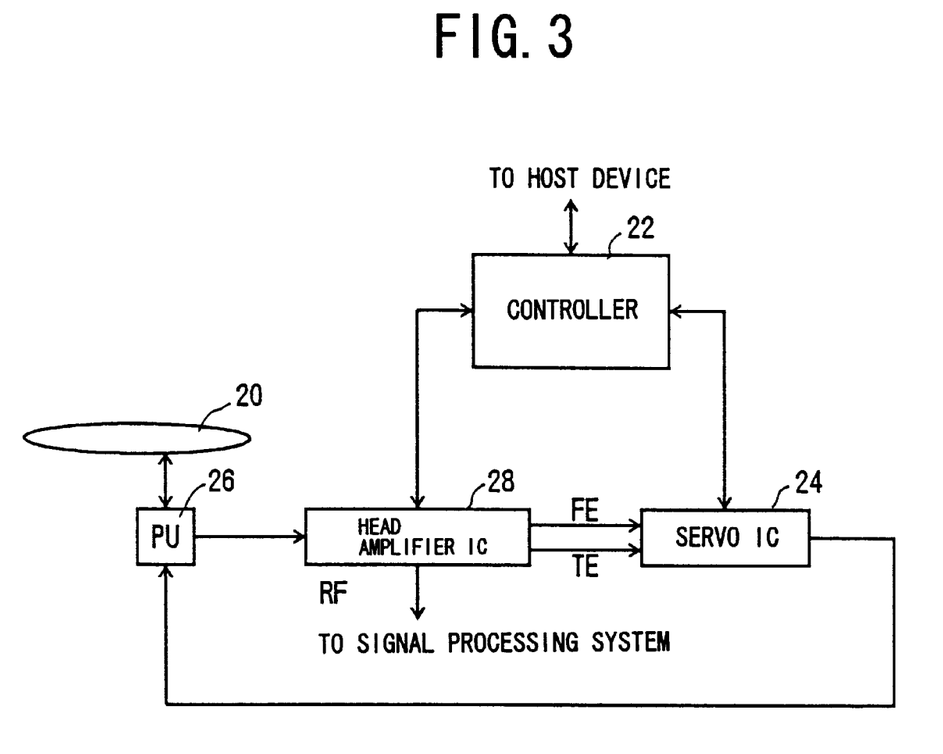
FIG. 3 is a block diagram of one embodiment of an optical disk device to which a circuit of the present invention is applied.

FIG. 3 is a block diagram of one embodiment of an optical disk device to which a circuit of the present invention is applied. An optical disk (CD-RW) 20 is driven by a spindle motor to rotate. A controller 22 supplies an instruction to a servo IC 24, in accordance with a record/reproduction command supplied from a host device. The servo IC 24 performs CLV (Constant Linear Velocity) servo for the spindle motor, and controls the rotation of a thread motor of an optical pickup 26, so that the optical pickup 26 is moved to a desired block on the optical disk 20, and focusing servo and tracking servo for the optical pickup 26 are performed.

Laser beam emitted from the optical pickup 26 is reflected by the recording surface of the optical disk 20, and then detected by the optical pickup 26. The reproduction signal obtained by the optical pickup 26 is supplied to a head amplifier IC 28, which shapes the waveform of the reproduction signal. This reproduction signal is supplied to the servo IC 24 and to a following signal processing system, in which the reproduction signal is subjected to EFM demodulation and wobble signal separation. The demodulated signal synchronized in the signal processing system is decoded and subjected to error correction, and then is outputted as reproduction data. Meanwhile, the head amplifier IC 28 generates and supplies a focusing error signal FE and a tracking error signal TE to the servo IC 24.

Figure 4:
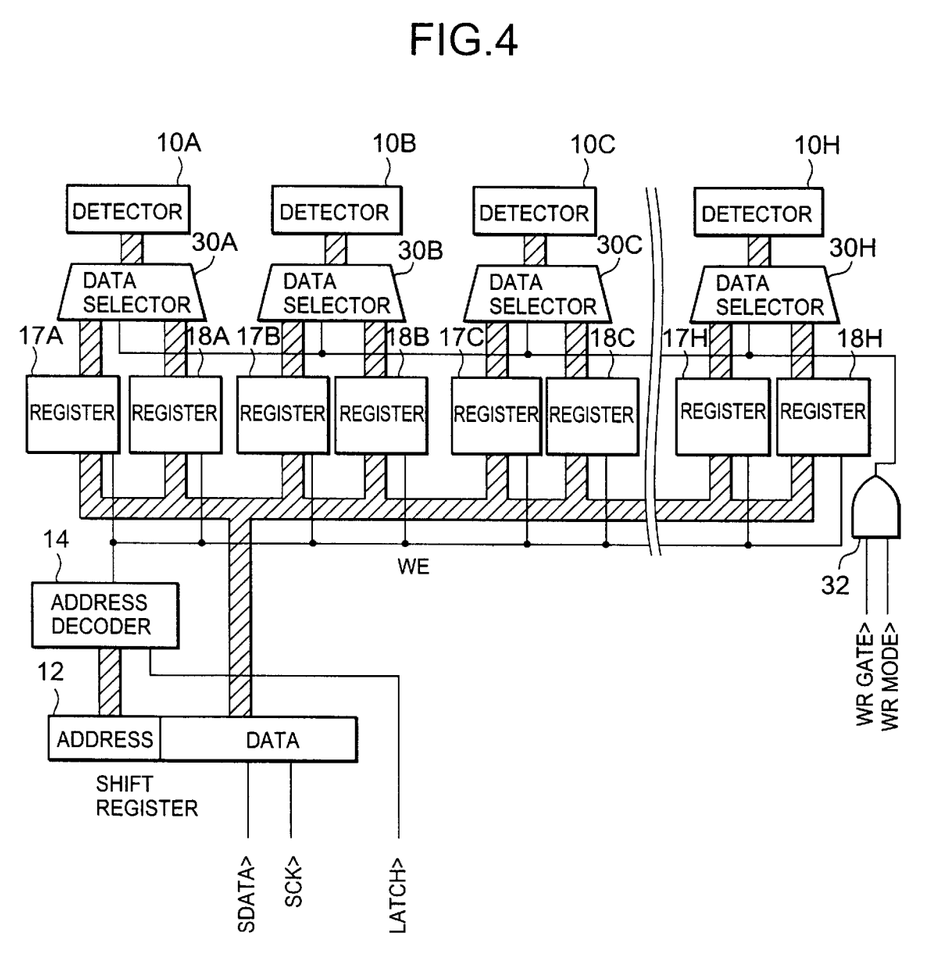
FIG. 4 is a block diagram of a first embodiment of a focusing and tracking servo circuit in accordance with the present invention.
Figure 5:
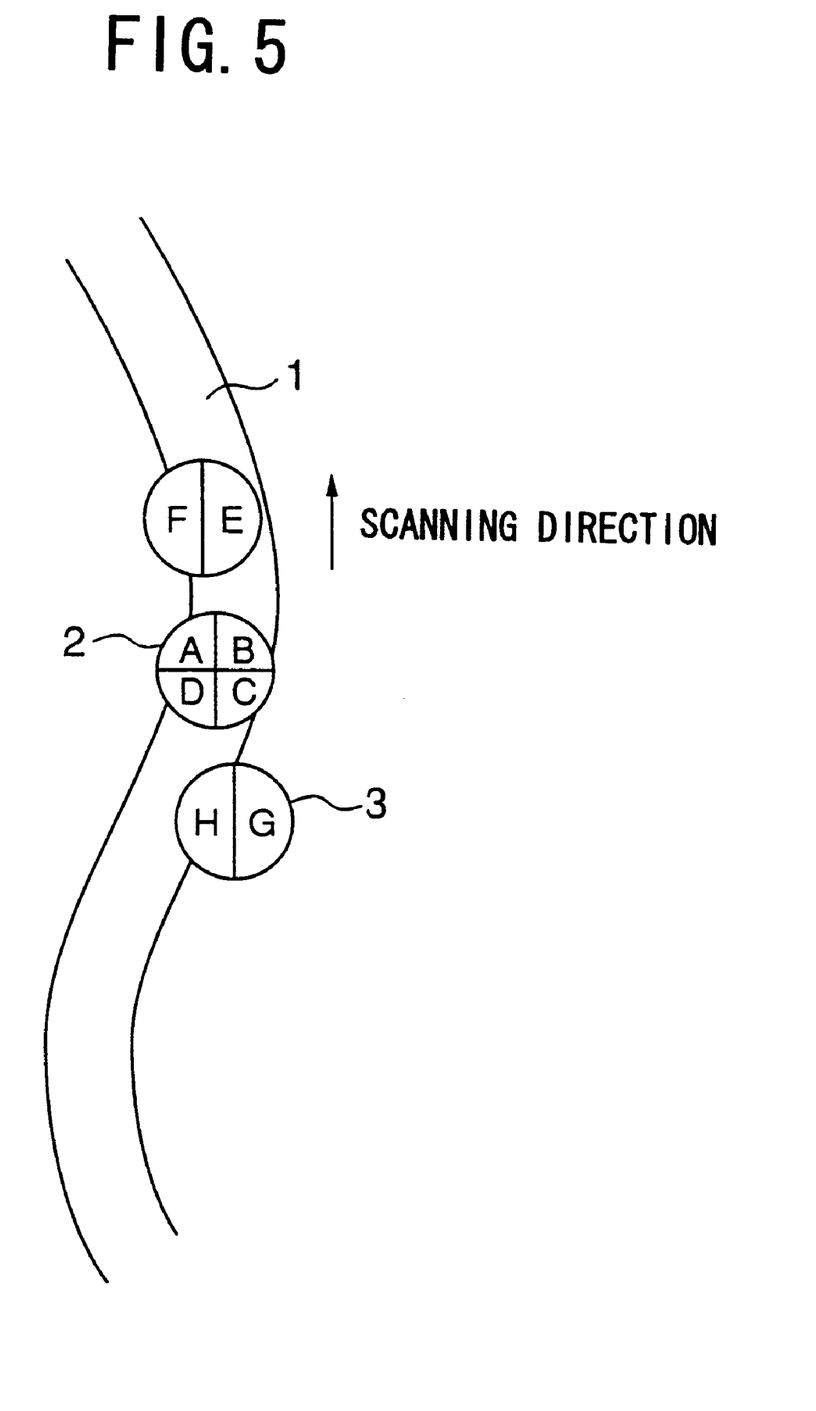
FIG. 5 is an illustration showing the relationship among a main light beam spot, a preceding sub beam spot, and a following sub beam spot, for a pregroove.

FIG. 4 is a block diagram of a first embodiment of the focusing and tracking servo circuit in accordance with the present invention. This circuit is disposed inside the head amplifier IC 28, and performs sensitivity switching of detectors. In FIG. 4, the same components as in FIG. 1 are denoted by the same reference numerals. A main light beam spot 2, a preceding sub beam spot 3, and a following sub beam spot 4 are emitted onto a pregroove 1. The reflection beam of the main light beam spot 2 is detected by divided detectors 10A, 10B, 10C, and 10D shown in FIG. 4. The reflection beam of the preceding sub beam spot 3 is detected by divided detectors 10E and 10F shown in FIG. 4. The reflection beam of the following sub beam spot 4 is detected by divided detectors 10G and 10H shown in FIG. 4. It should be noted that the divided portions of each beam spot shown in FIG. 3 are denoted by alphabets corresponding to the detectors.

The head amplifier IC 28 performs serial data transfer in order to reduce the number of pins. Once the optical disk 20 is inserted into the optical disk device, the heat amplifier IC 28 determines the type of the disk (for instance, CD-R or CD-RW) and notifies the controller 22 of the type of the disk. The controller 22 calculates the detector sensitivities at the time of read power and write power in accordance with the type of the disk, and serially transfers SDATA that includes the parameter data for setting the detector sensitivities at the time of the read power and the write power, and address data, to the head amplifier IC 28.

The SDATA is stored in a shift register 12 at the timing of a clock signal SCK. An address decoder 14 decodes the address data stored in the shift register 12, and transmits a write enable signal to one of read detector sensitivity registers 17A to 17H and write detector sensitivity registers 18A to 18H, whichever corresponds to the address. The detector sensitivity register (17B, for instance) that has received the write enable signal stores the parameter data transmitted from the shift register 12.

In the above manner, the read detector sensitivity parameter data of the detectors 10A to 10H are set in the read detector sensitivity registers 17A to 17H, respectively, and the write detector sensitivity parameter data of the detectors 10A to 10H are set in the write detector sensitivity registers 18A to 18H, respectively.

The parameter data stored in the detector sensitivity registers 17A and 18A to 17H and 18H, which are paired by the detector, is supplied to data selectors 30A to 30H. In accordance with the output of an AND circuit 32, at a time of reproduction, the data selectors 30A to 30H select the output data of the read detector sensitivity registers 17A to 17H. At a time of recording (when a write mode signal is high), when a high-level write gate signal is supplied, the data selectors 30A to 30H select the output data of the write detector sensitivity registers 18A to 18H. The data selectors 30A to 30H then supply the selected output data to the detectors 10A to 10H, respectively.

In the above manner, when the write gate signal becomes high at a time of recording, the detectors 10A to 10H are switched from the read detector sensitivity to the write detector sensitivity. Thus, the focusing and tracking servo at a time of switching between recording and reproduction can be stably performed.

Figure 6:
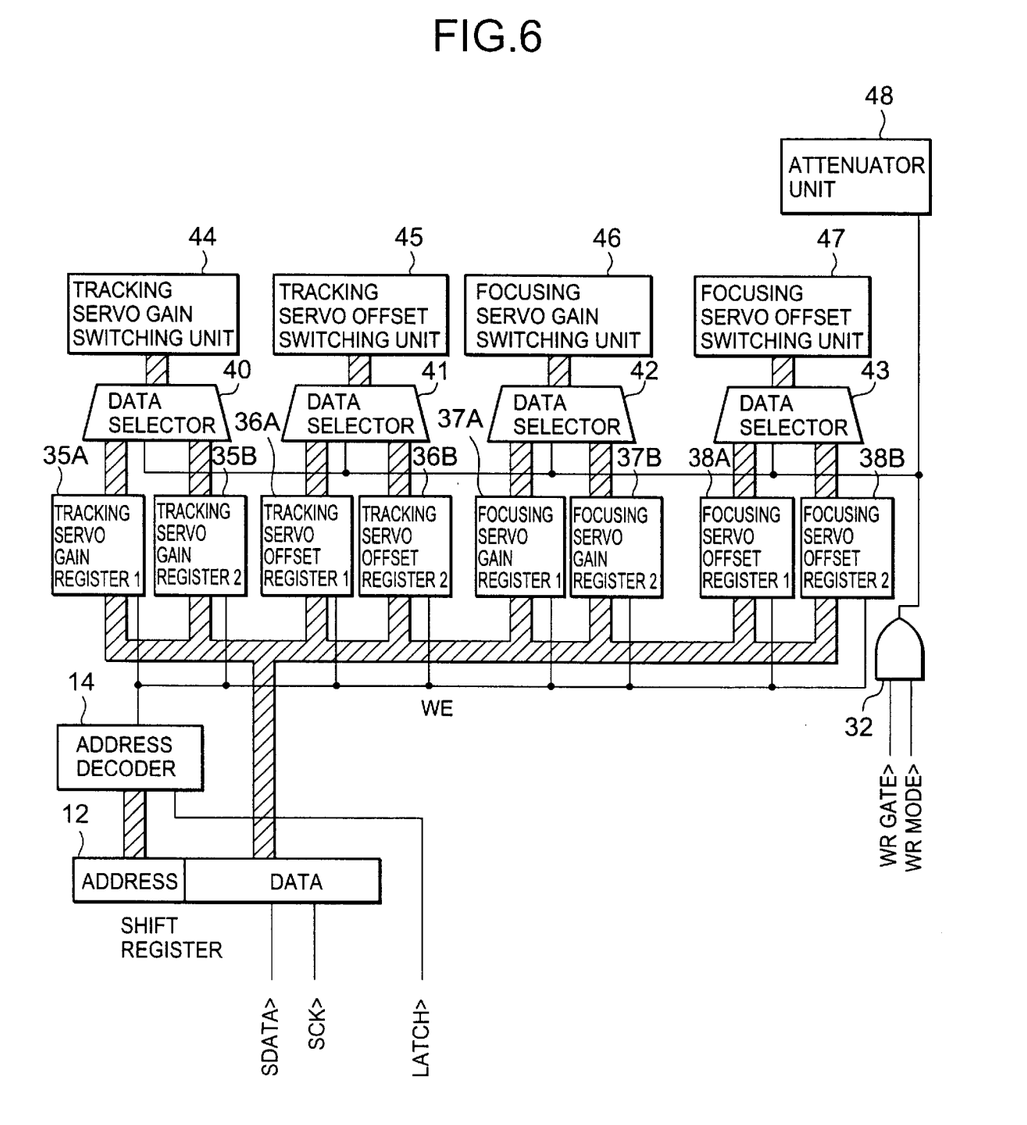
FIG. 6 is a block diagram of a second embodiment of the focusing and tracking servo circuit in accordance with the present invention.

FIG. 6 is a block diagram of a second embodiment of the focusing and tracking servo circuit of the present invention. This circuit is disposed inside the head amplifier IC 28, and switches the detector sensitivities. The circuit shown in FIG. 6 also switches the servo gain and offset. In FIG. 6, the same components as in FIG. 4 are denoted by the same reference numerals.

Once the optical disk 20 is inserted into the optical disk device, the head amplifier IC 28 determines the type of the disk (CD-R or CD-RW, for instance), and notifies the controller 22 of the determined type of the disk. The controller 22 calculates the detector sensitivity corresponding to the type of the disk at a time of read power and at a time of write power, and servo gain and the offset of the focusing and tracking servo circuit. The controller 22 then serially transfers data SDATA that includes parameter data for setting the detector sensitivity at a time of read power and at a time of write power, the servo gain and offset, and address data, to the head amplifier IC 28.

The data SDATA is stored in the shift register 12 at the timing of the clock signal SCK. The address decoder 14 decodes the address data stored in the shift register 12, and transmits a write enable signal to one of a read tracking servo gain register 35A, a write tracking servo gain register 35B, a read tracking servo offset register 36A, a write tracking servo offset register 36B, a read focusing servo gain register 37A, a write focusing servo gain register 37B, a read focusing servo offset register 38A, and a write focusing servo offset register 38B, whichever corresponds to the address. The register that has received the write enable signal stores the parameter data transmitted from the shift register 12.

In the above manner, the parameter data of the read tracking servo gain, the write tracking servo gain, the read tracking servo offset, the write tracking servo offset, the read focusing servo gain, the write focusing servo gain, the read focusing servo offset, the write focusing servo offset, can be set in the registers 35A to 38B, respectively.

The parameter data of the registers 35A and 35B to 38A to 38B is supplied to data selectors 40 to 43. In accordance with the output of the AND circuit 32, at a time of reproduction, the data selectors 40 to 43 select the output data of the read registers 35A, 36A, 37A, and 38A. At a time of recording (when the write mode signal is high), the data selectors 40 to 43 select the output data of the write registers 35B, 36B, 37B, and 38B when a high-level write gate signal is supplied. The data selectors 40 to 43 then supply the selected output data to a tracking servo gain switching unit 44, a tracking servo offset switching unit 45, a focusing servo gain switching unit 46, and a focusing servo offset switching unit 47.

The output of the AND circuit 32 is also supplied to an attenuator unit 48. This attenuator unit 48 roughly switches the attenuation for the output of each of the detectors 10A to 10H at a time of recording or reproduction. After that, fine adjustment is carried out by the tracking servo gain switching unit 44, the tracking servo offset switching unit 45, the focusing servo gain switching unit 46, and the focusing servo offset switching unit 47. The offset switching is performed at a time of reproduction or recording, because the detector sensitivity is so roughly set that the offset value differs between a recording time and reproduction time, and the amplifier offset varies with the servo gain.

Figure 7:
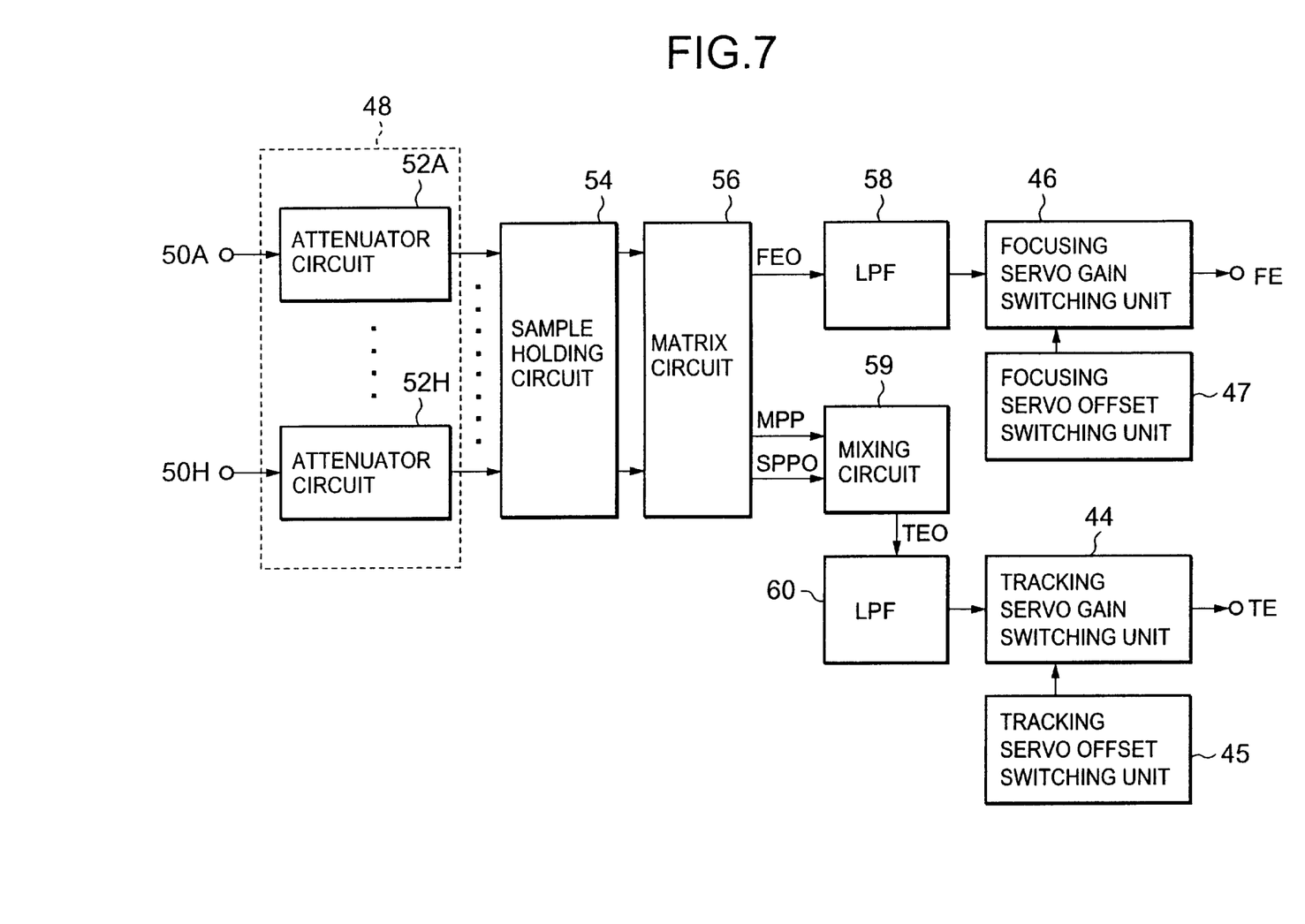
FIG. 7 is a block diagram of one embodiment of a head amplifier.

FIG. 7 is a block diagram of an example structure of the head amplifier IC 28. As shown in FIG. 7, terminals 50A to 50H receive output signals A to H from the detectors 10A to 10H, respectively. Attenuator circuits 52A to 52H that constitute the attenuator unit 48 roughly set each detector sensitivity, and then supply the signals A to H to a sample holding circuit 54 that holds each signal at predetermined timing.

The signals A to H outputted from the sample holding circuit 54 are supplied to a matrix circuit 56, which obtains a focusing signal FEO=(A+C)−(B+D), a tracking signal MPP=(A+D)−(B+C), and a signal SPPO=(F+H)−(E+G).

The signal FEO is supplied to the focusing servo gain switching unit 46 via a low pass filter 58. The focusing servo gain switching unit 46 is accompanied by the focusing servo offset switching unit 47, so that gain and offset operations are performed on the signal FEO. As a result, a focusing error signal FE is generated and outputted.

The signal MPP and the signal SPPO are mixed by a mixing circuit 59, which generates a signal TEO=(A+D)−(B+C)−k·[(F+H)−(E+G)] (k is a predetermined coefficient). The signal TEO is supplied to the tracking servo gain switching unit 44 via a low pass filter 60. The tracking servo gain switching unit 44 is accompanying by the tracking servo offset switching unit 45, so that gain and offset operations are performed on the signal TEO. As a result, a tracking error signal TE is generated and outputted.

Figure 8:
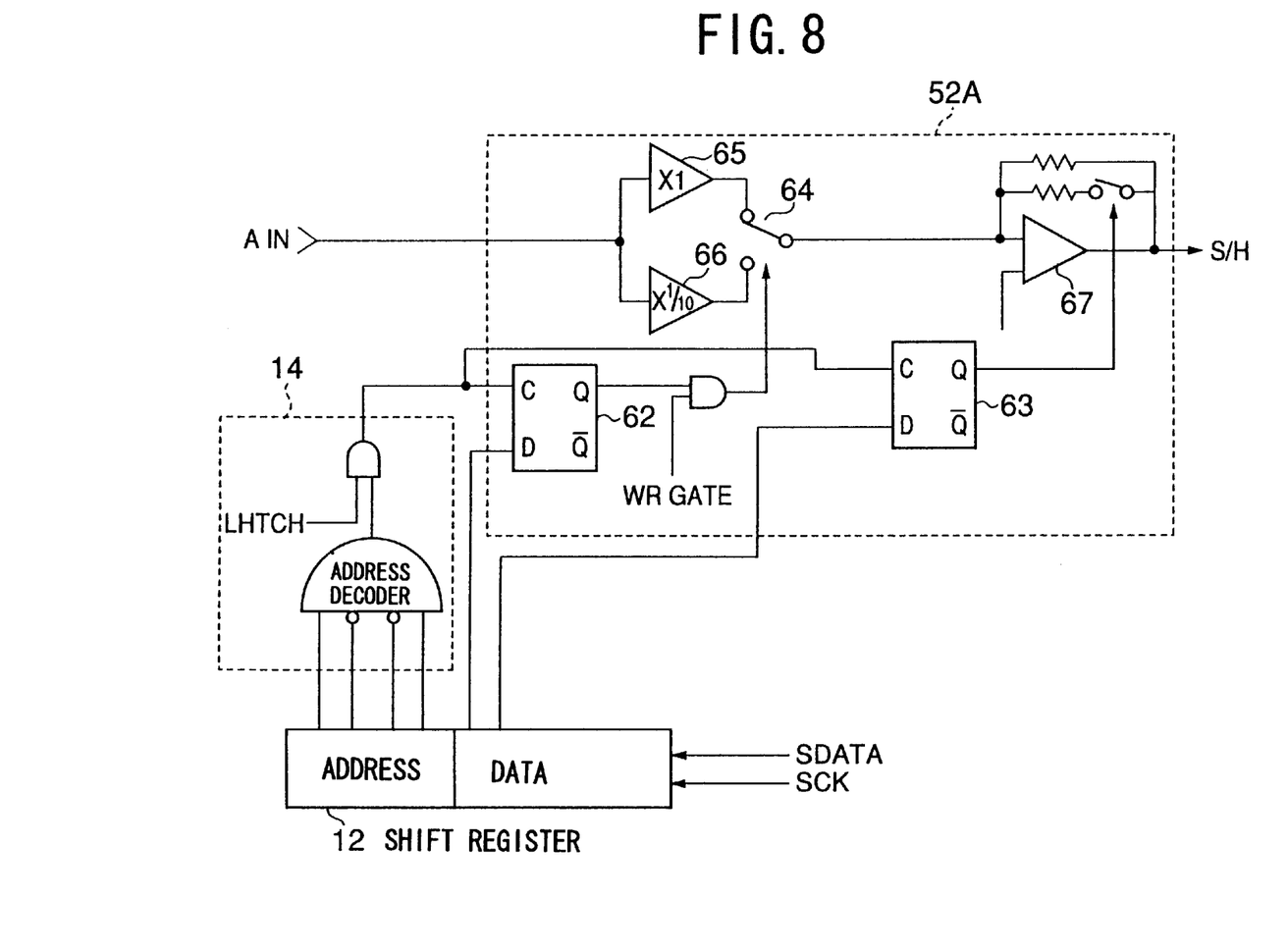
FIG. 8 is a circuit diagram of one embodiment of an attenuator circuit.

FIG. 8 is a circuit diagram of an example of the attenuator circuit 52A. The other attenuator circuits 52B to 52H have the same structure as the attenuator circuit 52A. As shown in FIG. 8, the parameter data from the shift register 12 is set in D-type flip-flops 62 and 63. At a time of activating, a switch 64 selects a 0 DB amplifier 65 for the reproduction mode. After the determination of the disk based on reflection beam from the optical disk 20, the parameter data in accordance with the type of the disk is transmitted from the controller 22 and set in the flip-flop 63. The gain of an amplifier 67 is then switched.

When a recording command is inputted at a time of recording, parameter data for switching the switch 64 to a −20 dB amplifier 66 is transmitted and stored in the flip-flop 62. A write gate is then opened, so that the sensitivity of the detector 10A is instantly switched to the recording mode.

Figure 9:
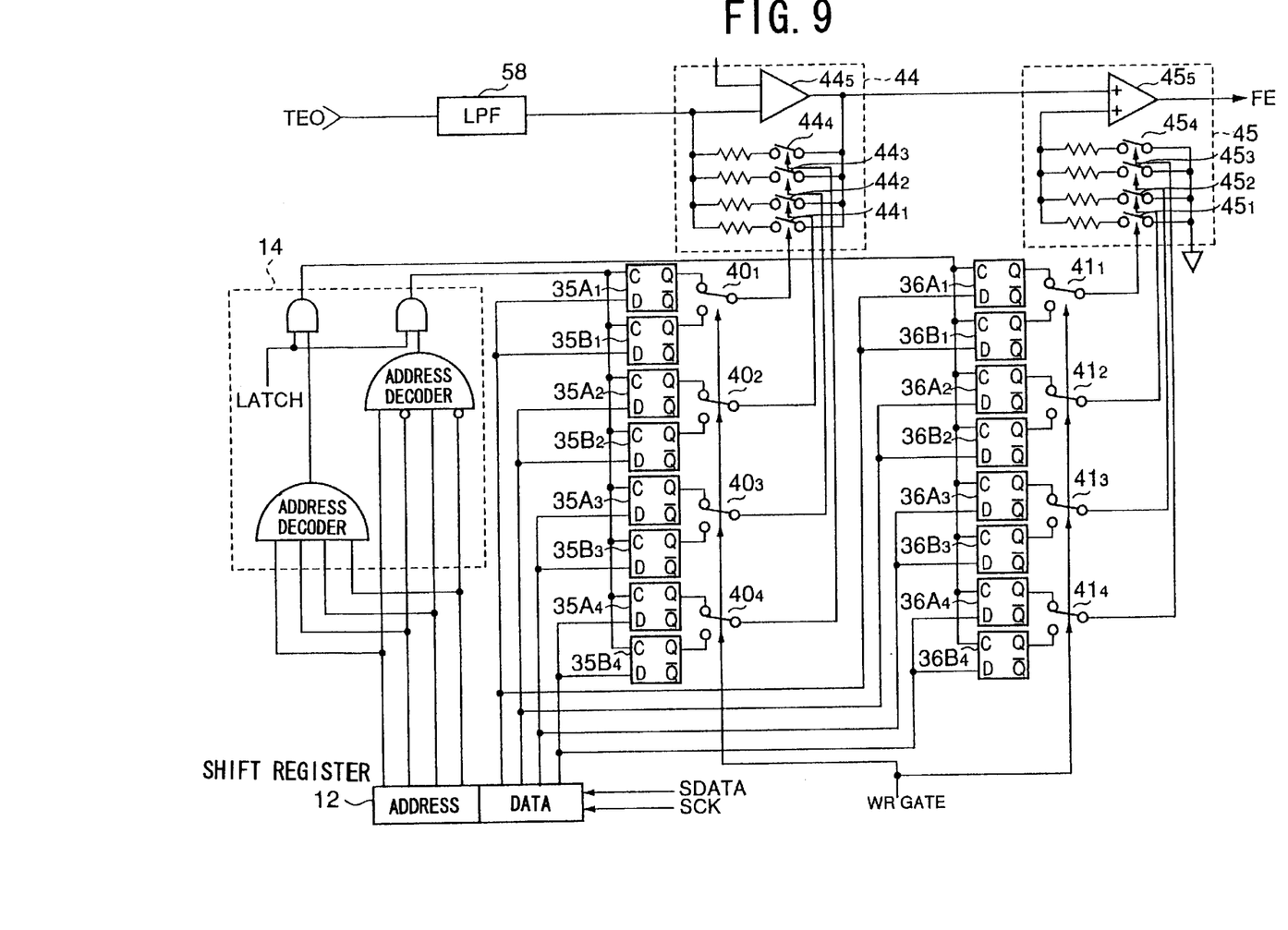
FIG. 9 is a circuit diagram of one embodiment of a switching circuit of tracking servo gain and offset.

FIG. 9 is a circuit diagram of an example of a tracking servo gain and offset switching circuit. It should be understood here that a focusing servo gain and offset switching circuit has the same structure. In FIG. 9, the same components as in FIG. 6 are denoted by the same reference numerals.

As shown in FIG. 9, D-type flip-flops $35A_1$ to $35A_4$ constitute the read tracking servo gain register 35A, D-type flip-flops $35B_1$ to $35B_4$ constitute the write tracking servo gain register 35B, D-type flip-flops $36A_1$ to $36A_4$ constitute the read tracking servo offset register 36A, and D-type flop-flops $36B_1$ to $36B_4$ constitute the write tracking servo offset register 36B. Switches $40_1$ to $40_4$ constitute the data selector 40, and switches $41_1$ to $41_4$ constitute the data selector 41.

The tracking servo gain switching unit 44 varies the gain of an amplifier $44_5$ switches $44_1$ to $44_4$ that are switched on and off in accordance with the output of the switches $40_1$ to $40_4$ of the data selector 40. The tracking servo offset switching unit 45 varies the offset, which is added by an adder $45_5$, by switches $45_1$ to $45_4$ that are switched on and off in accordance with the output of the switches $41_4$ to $41_4$ of the data selector 41.

After the determination of the type of the disk in accordance with the reflection beam from the optical disk 20 at a time of activation, the parameter data based on the determined type of the disk is transmitted from the controller 22. Accordingly, the parameter data of the read tracking servo gain is set in the D-type flip-flops $35A_1$ to $35A_4$, and the parameter data of the read tracking servo offset is set in the D-type flip-flops $36A_1$ to $36A_4$. Likewise, the parameter data of the write tracking servo gain is set in the D-type flip-flops $35B_1$ to $35B_4$, and the parameter data of the write tracking servo offset is set in the D-type flip-flops $36B_1$ to $36B_4$. The tracking servo gain switching unit 44 sets the gain in accordance with the output of the D-type flip-flops $35A_1$ to $35A_4$ transmitted via the switches $40_1$ to $40_4$ of the data selector 40. The tracking servo offset switching unit 45 sets the offset in accordance with the output of the D-type flip-flops $36A_1$ to $36A_4$ transmitted via the switches $41_1$ to $41_4$ of the data selector 41.

When the write gate is opened at a time of recording, the tracking servo gain switching unit 44 sets the gain in accordance with the output of the D-type flip-flops $35B_1$ to $35B_4$ via the switches $40_1$ to $40_4$ of the data selector 40. The tracking servo offset switching unit 45 sets the offset in accordance with the output of the D-type flip-flops $36B_1$ to $36B_4$ via the switches $41_1$ to $41_4$ of the data selector 41. In this manner, the sensitivity of the detector 10A is instantly switched to the recording mode.

Figure 10:
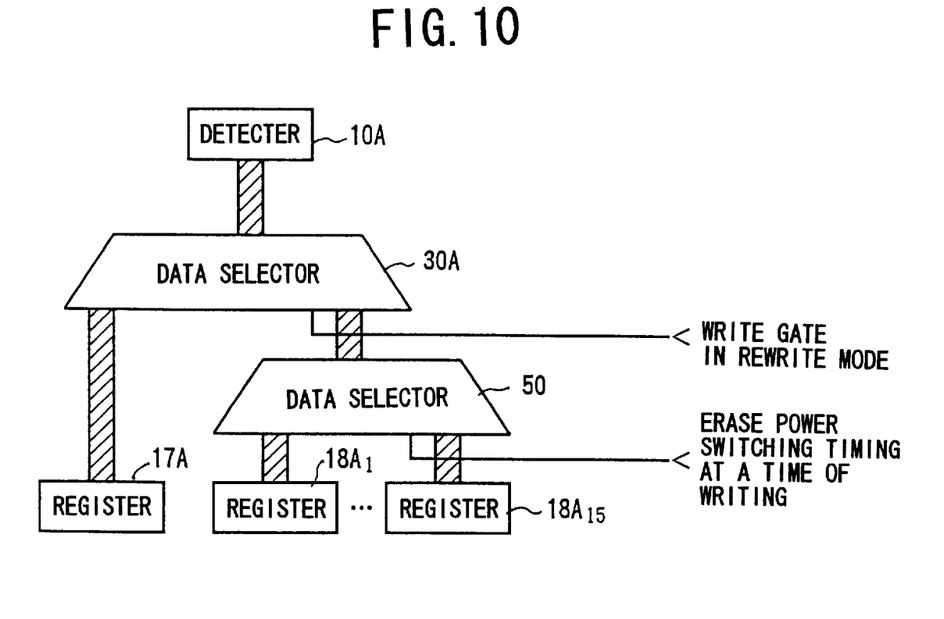
FIG. 10 is a block diagram of a part of a modification of the focusing and tracking servo circuit of the present invention.

FIG. 10 is a block diagram of a part of a modification of the focusing and tracking servo circuit shown in FIG. 4. FIG. 10 only shows the part related to the detector 10A, but the other detectors 10B and 10H each have the same structure as the detector 10A. In this modification, a plurality of write detector sensitivity registers $18A_1$ to $18A_{15}$ are employed. In a recording operation in which write power and erase power are alternately applied, a data selector 50 switches the write detector sensitivity corresponding to the erase power.

In a CD-RW, before recording is performed on the optical disk, test write is performed in a power calibration area (PCA) on the inner periphery of the disk, so as to determine the optimum recording power. This is called an optimum power control (OPC) operation. In this operation, the write power and erase power are varied in 15 steps, with a power value stored in advance in the optical disk device being the center value. With the 15-step varied write power and erase power, test write is performed. Prior to switching of the OPC, the detector sensitivities corresponding to the 15-step varied power values are stored in the write detector sensitivity registers $18A_1$ to $18A_{15}$, and the detector sensitivities of all the detectors 10A to 10H is at once switched in 15 steps, based on the timing of changing the erase power.

Also, in order to accommodate a running OPC for changing the optimum recording power in a few steps during a recording operation, the detector sensitivities corresponding to 5 steps power values consisting of the optimum recording power as center value and two values each below and above the center value are stored in the write detector sensitivity registers $18A_1$ to $18A_5$. Based on the timing of changing the erase power during the recording operation, the detector sensitivities of all the detectors are switched at once. Although the detector sensitivity switching is shown in this modification, the switching of the servo gain and offset may of course be performed in the same structure.

The embodiments of the present invention have been described by way of examples using a CD-RW, but the present invention can also be applied to other types of rewritable optical disks such as MD (MiniDisk).

The present invention is not limited to the specifically disclosed embodiments, but variations and modifications may be made without departing from the scope of the present invention.

The present application is based on Japanese priority application No. 11-271163, filed on Sep. 24, 1999, the entire contents of which are hereby incorporated by reference.

What is claimed is:

1. A focusing and tracking servo circuit used in an optical disk device, which performs recording by increasing light beam power applied onto an optical disk, and performs focusing and tracking servo, said circuit comprising:

a detector unit that detects the light beam reflected from the optical disk, said detector unit having a plurality of detecting parts, each of the detecting parts having two memory portions so as to store detection sensitivity parameters for recording and reproduction;

a first storage unit that stores a parameter corresponding to light beam power at a time of recording;

a second storage unit that stores a parameter corresponding to light beam power at a time of reproduction; and a selector unit that selects a parameter from the parameters stored in the first and second storage units upon switching between recording and reproduction, each of the parameters is a detection sensitivity of said detector unit and the selected parameter is set in said detector unit, wherein the detection sensitivity parameters for recording and reproduction are detected by said detecting parts in accordance with the type of optical disk attached to the optical disk device, and are serially transferred and sequentially stored in said two memory portions.

2. The focusing and tracking servo circuit as claimed in claim 1, further comprising a tracking servo gain switching unit, a tracking servo offset switching unit, a focusing servo gain switching unit, and a focusing servo offset switching unit, wherein the selected parameter is set in a corresponding one of the tracking servo gain switching unit, the tracking servo offset switching unit, the focusing servo gain switching unit, and the focusing servo offset switching unit.

3. A focusing and tracking servo circuit used in an optical disk device, which performs recording by increasing light beam power applied onto an optical disk, and performs focusing and tracking servo, said circuit comprising:

a detector unit that detects the light beam reflected from the optical disk;

a first storage unit that stores a parameter corresponding to light beam power at a time of recording;

a second storage unit that stores a parameter corresponding to light beam power at a time of reproduction;

a selector unit that selects a parameter from the parameters stored in the first and second storage units upon switching between recording and reproduction, wherein each of the parameters is a servo gain and offset of the focusing and tracking servo circuit; and two memory parts are provided to store parameters for recording and reproduction for each of a focusing servo gain, a focusing offset, a tracking servo gain and a tracking offset wherein the focusing servo gain, the focusing offset, the tracking servo gain and the tracking offset for recording and reproduction are serially transferred and sequentially stored in said two memory parts in accordance with the type of the optical disk attached to the optical disk device.

4. An optical disk device comprising:

an optical pickup that detects reflection light from an optical disk and generates a reproduction signal; and a servo unit that controls movement of the optical pickup, the servo unit including a focusing and tracking servo circuit which performs recording by increasing light beam power applied onto the optical disk and also performs focusing and tracking servo, the focusing and tracking servo circuit comprising:

a detector unit that detects the light beam reflected from the optical disk, said detector unit having a plurality of detecting parts, each of the detecting parts having two memory portions so as to store detection sensitivity parameters for recording and reproduction;

a first storage unit that stores a parameter corresponding to light beam power at a time of recording;

a second storage unit that stores a parameter corresponding to light beam power at a time of reproduction; and a selector unit that selects a parameter from the parameters stored in the first and second storage units upon switching between recording and reproduction each of the parameters is a detection sensitivity of said detector unit and the selected parameter is set in said detector unit, each of the parameters is a detection sensitivity of said detector unit and the selected parameter is set in said detector unit, wherein the detection sensitivity parameters for recording and reproduction are detected by said detecting parts in accordance with the type of optical disk attached to the optical disk device, and are serially transferred and sequentially stored in said two memory portions.

5. The optical disk device as claimed in claim 4, wherein:

the focusing and tracking servo circuit further comprises a tracking servo gain switching unit, a tracking servo offset switching unit, a focusing servo gain switching unit, and a focusing servo offset switching unit; and the selected parameter is set in a corresponding one of the tracking servo gain switching unit, the tracking servo offset switching unit, the focusing servo gain switching unit, and the focusing servo offset switching unit.

6. An optical disk device comprising:

an optical pickup that detects reflection light from an optical disk and generates a reproduction signal; and a servo unit that controls movement of the optical pickup, the servo unit including a focusing and tracking servo circuit which performs recording by increasing light beam power applied onto the optical disk and also performs focusing and tracking servo, the focusing and tracking servo circuit comprising:

a detector unit that detects the light beam reflected from the optical disk;

a first storage unit that stores a parameter corresponding to light beam power at a time of recording;

a second storage unit that stores a parameter corresponding to light beam power at a time of reproduction;

a selector unit that selects a parameter from the parameters stored in the first and second storage units upon switching between recording and reproduction;

wherein each of the parameters is a servo gain and offset of the focusing and tracking servo circuit; and two memory parts are provided to store parameters for recording and reproduction for each of a focusing servo gain, a focusing offset, a tracking servo gain and a tracking offset wherein the focusing servo gain, the focusing offset, the tracking servo gain and the tracking offset for recording and reproduction are serially transferred and sequentially stored in said two memory parts in accordance with the type of the optical disk attached to the optical disk device.

* * * * *